United States Patent [19]
Hedlund

[11] Patent Number: 4,621,495
[45] Date of Patent: Nov. 11, 1986

[54] SYNCHRONIZED MECHANICAL-HYDROSTATIC GEARBOX

[75] Inventor: Bo Hedlund, Söderhamn, Sweden

[73] Assignee: Stensele Mekaniska Verkstad AB, Sweden

[21] Appl. No.: 625,005

[22] Filed: Jun. 26, 1984

[51] Int. Cl.[4] .............................................. F16H 39/46
[52] U.S. Cl. ......................................... 60/447; 60/494
[58] Field of Search .......................... 60/447, 494, 445

[56] References Cited

U.S. PATENT DOCUMENTS

| | | | |
|---|---|---|---|
| 3,964,262 | 6/1976 | Patton | 60/447 |
| 3,990,235 | 11/1976 | Bauchet | 60/413 |
| 4,215,545 | 8/1980 | Morello et al. | 60/413 |

FOREIGN PATENT DOCUMENTS

| | | |
|---|---|---|
| 2015945 | 10/1971 | Fed. Rep. of Germany . |
| 2307550 | 8/1974 | Fed. Rep. of Germany . |
| 2087521 | 5/1982 | Fed. Rep. of Germany ........ 60/447 |
| 403396 | 11/1965 | Sweden . |

Primary Examiner—A. Michael Chambers
Attorney, Agent, or Firm—Stevens, Davis, Miller & Mosher

[57] ABSTRACT

A synchronized mechanical-hydrostatic gearbox with infinitely variable drive ratio including a hydrostatic gear and a following mechanical gear coupled thereto. The hydrostatic gear includes a hydraulic transmission motor with variable displacement which is connected to the mechanical gear. The mechanical gear is made with at least two gear ratio stages and with means adapted for altering the displacement of the hydraulic transmission motor on alteration of the gear ratio of the mechanical gear to an extent corresponding to the gear ratio change. The gear box is intended to be incorporated in a transmission for vehicles, particularly terrain vehicles, preferably driven by an internal combustion engine.

9 Claims, 2 Drawing Figures

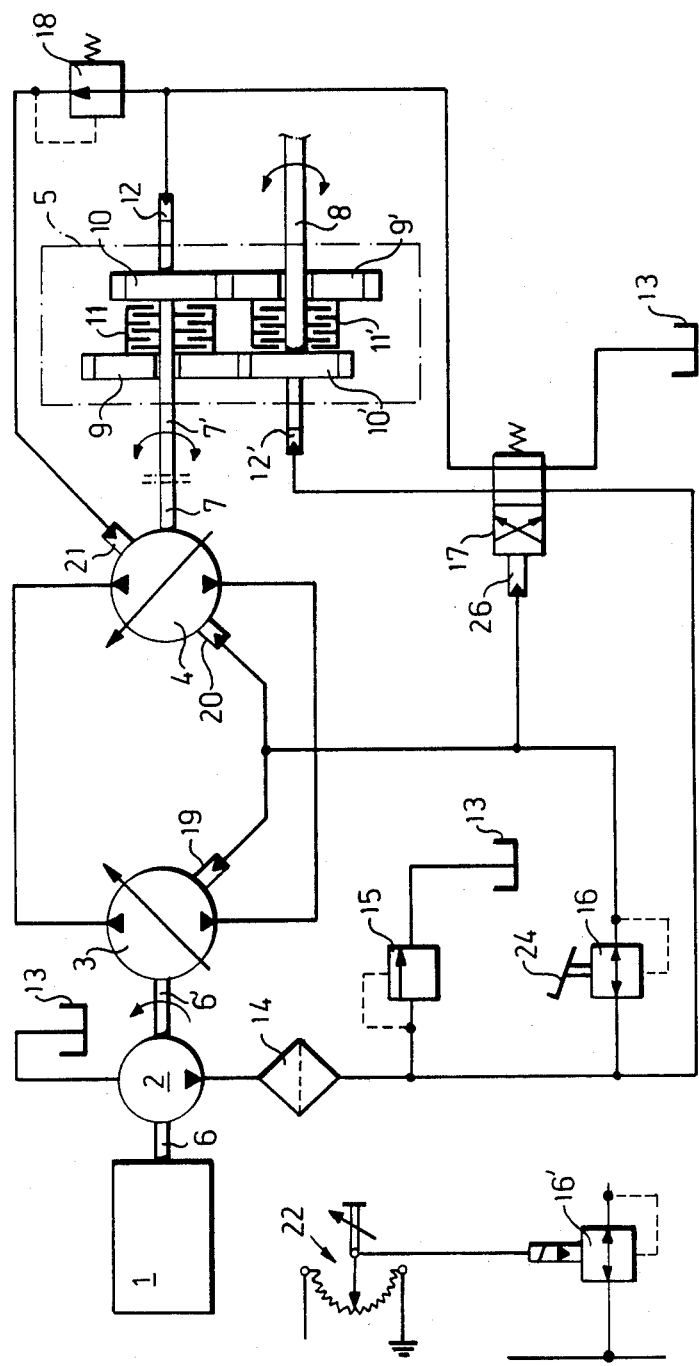

SYNCHRONIZED MECHANICAL-HYDROSTATIC GEARBOX

The present invention relates to a synchronized mechanical-hydro-static gearbox with an infinitely variable drive ratio, including a hydrostatic gear and a mechanical gear coupled to, and following after the hydrostatic gear.

The need of large propulsion power, i.e. large transmitted torque, for a vehicle at low speeds, and high rotational speed at high road speeds can not be satisfied with hydrostatic transmissions known up to now, which include variable displacement hydraulic pumps and hydraulic motors. Available components for such hydrostatic transmissions limit both transmitted torque and permitted rotational speed, and it is not possible to cover a sufficiently large speed range solely with variable displacement pump and motor units. Up to now a mechanical gearbox has therefore been used, which due to prices and the known art has been of a more simple type with different fixed gear ratios. It has thus been necessary to stop the vehicle to change from terrain gear, to road speed gear (from low to high gear). It is possible, for example, to have a gear for the speed range of 0-15 km/h and a gear for the range of 0-30 km/h. Such previously known gearboxes are thus arranged with two or more speed ranges, all of which start from zero speed, however.

It is obvious that there is a considerable disadvantage in needing to stop the vehicle to alter the gear ratio and this has been a hindrance in use.

With transmissions of the hydrodynamic or torque converter type, there is continuous slip between the input and output shafts. The slip increases for increasing load and the rotational speed is thus lowered on the output shaft. In order to provide a hydrodynamic transmission with a sufficiently large speed range the converter has been provided with a following mechanical gear constructed such that gear changing can take place while the vehicle is being driven. In such a case the mechanical gearbox is of the so-called power-shift type which means that at the gear-changing instant two gear ratios are simultaneously engaged during successive transfer of the mesh via slip clutches. The momentary rotational speed change which will be the result in the gear changing instant is taken up by the slip in the converter and the vehicle continues without any notable jerk in speed. Gear changing is carried out manually by the driver and always acts solely on the mechanical gearbox, the hydrodynamic part of the transmission adjusting itself automatically to the new rotational speed. The consequence will thus be a lowering of the input rotation speed to the converter and thereby also that of the driving unit, if a change up is carried out. For changing down the rotational speeds are of course increased.

Attempts have also been made with hydrostatic transmission to change speed with a power-shift gearbox so that a sufficiently large speed range can be obtained, but the inelastic hydrostatic gear does not function as a damper in changing speed, and a heavy jerk occurs, which feels uncomfortable and results in large stresses on both driver and vehicle.

The object of the present invention is to eliminate the disadvantages in the prior art that have been discussed above.

This object is obtained with a synchronized, mechanical-hydrostatic gearbox of the kind mentioned in the introduction.

The condition for a jerk-free gear change between two variable-speed gearboxes, a hydrostatic and a mechanical gearbox in the case in question, is that the output shaft from the one gearbox is always given the same rotational speed that is to be obtained by the input shaft in the other gearbox, the two shafts being coupled together. In other words, the gear change must be synchronized.

An embodiment selected as an example of the combined gearbox in accordance with the invention will now be described in detail in the following with reference to the figures, where:

FIG. 1 illustrates a vehicle transmission with an implementation of the combined gearbox in accordance with the invention and FIG. 2 an alternative embodiment of the control of a speed maintenance valve in the transmission according to FIG. 1.

A vehicle transmission in its entirety is illustrated in FIG. 1, and consists of a diesel engine 1 driving via a shaft 6 a hydraulic pump 2 for servo pressure, and a hydraulic transmission pump 3 via a shaft extension 6', this pump having adjustable displacement and a flow that can be directed both on the pressure and return sides to a hydraulic transmission motor 4, which also has adjustable displacement. Via a shaft 7 the hydraulic transmission motor is rigidly connected to the input shaft 7' of a mechanical gearbox 5, the gearbox being of the so-called power-shift type, and in this embodiment constructed with two gear ratios. Via shaft 8 the mechanical gearbox 5 is connected to a power consumer, in this case the driving wheels of a land vehicle.

Synchronized gear change can take place if the common shaft 7, 7' in FIG. 1 for both the hydrostatic gear 3, 4 and the mechanical gear 5 can be provided with the conditions for having the same rotational speed alteration. This is possible if the alteration in gear ratio is just as great, and the gear change takes place simultaneously, in both gearboxes. Since both the hydrostatic gearbox 3, 4 and the mechanical gearbox 5 can change gears while full torque is being transmitted, the transmission in its entirety can change gear "infinitely variably" during the transmission of full power in a vehicle.

In order to simplify the description so that it solely relates to the gear changing function, it is assumed that the diesel engine 1 of the vehicle operates at constant rotational speed in an embodiment for complete vehicle power transmission. A speed regulation device of a known type causes fuel supply to be adjusted to the power the diesel engine 1 is to supply. Only one embodiment of the control of the components included in the transmission is described, in this case a substantially hydraulic control system.

To keep the continued description as simple as possible, consider now the initial situation where a stationary vehicle with the transmission illustrated in FIG. 1, the diesel engine 1 being assumed, as mentioned, to operate at constant revolutions and at such a level that increased fuel supply allows full torque take-off.

In the initial situation, the displacement of the hydraulic pump 3 is zero, resulting in that the hydraulic motor 4, with its displacement initially at a maximum, does not rotate, which in turn naturally means that the vehicle is stationary. To put the vehicle into motion, a speed maintenance valve 16 is actuated, e.g. by a mechanical foot pedal 24, and proportional to the pedal position the valve is caused to supply control pressure from the servo pump 2 to the setting means 19 of the hydraulic pump 3 and the setting means 20 of the hydraulic motor 4 and to the setting means 26 for the gear selector valve 17 of the mechanical gearbox 5. In the initial situation, the gear selector valve 17 directs servo pressure to an engaging means 12' for the hydraulic clutch 11' of the mechanical gearbox 5, the clutch 11' thus connecting a gear wheel 9' to the output shaft 8 and by the meshing of this gear wheel 9' with a gear wheel 10 on the input shaft 7' is achieved that the gearbox 5 operates with its larger gear ratio (low speed gear).

The servo pressure is maintained constant with the aid of a pressure regulating valve 15, and the servo oil from the tank is cleaned in a filter 14.

On increased actuation of the speed maintenance valve 16, the pressure level of the control pressure to the setting means 19 and 20 is increased. The setting means 19 is adjusted to react first, and thus successively increases the displacement of the hydraulic pump 3, with the resulting increased flow from the pump causing the hydraulic motor 4 to rotate, and thereby causing the vehicle to move with increasing speed. When the control pressure has reached the level where the displacement of the hydraulic pump has arrived at its maximum, the setting means 20 begins to reduce displacement of the hydraulic motor 4, and the shaft 7, 7' and the shaft 8 further increase their rotational speed. When the hydraulic motor 4 has been brought to its minimum displacement the speed of the shaft 7, 7' cannot be increased further. For the case where this speed range is insufficient, as discussed above, the setting means 26 of the gear selector valve 17 has been adjusted such as to change, at this point in the operation of the control pressure, the engagement position so that the servo pressure from the setting means 12' and clutch 11' is diverted to a tank 13. The engagement of the gear wheel 9' to the shaft 8 is thus released, simultaneously as the servo pressure actuates another setting means 12 and another clutch 11 associated with the gearbox 5 so that a gear wheel 9 is connected to the shaft 7, 7', whereby the output shaft 8 can be driven via a gear wheel 10' at the lower gear ratio (high speed gear) of the gearbox 5.

This method would give the shaft 8 a momentary rotational speed increase. However, during the gear change instant the servo pressure also actuates the setting means 21 on the hydraulic motor 4 via a pressure regulation valve 18 with exactly the pressure required for counteracting the reduction by the setting means 20 of the hydraulic motor displacement, so that the displacement increases to an extent such that the rotational speed of the shaft 7, 7' is instead reduced by an amount corresponding to the difference in gear ratio between high and low speed range in the mechanical gearbox 5. In the described embodiment the maximum and minimum displacements of the hydraulic motor 4 have been selected in a proportion such that the latter exactly corresponds to the gear ratio change in the mechanical gearbox 5.

For a further increase in the control pressure to the setting means 20 the rotational speed of the hydraulic motor 4 can once again be increased and thereby further increase the rotational speed of the output shaft 8.

When the hydraulic motor has reached its minimum displacement, increase in speed can be continued by increasing the rotational speed of the diesel engine 1.

When it is subsequently decided to lower the speed, this is done first by lowering the rotational speed of the engine 1 to its normal operational speed, after which the control pressure is lowered and the transmission goes through the above-described sequences in reverse order to lower the speed of the shaft 8, first by increasing the displacement of the hydraulic motor 4 and thereafter by changing down when the control pressure falls below that for maintaining the switching position of the gear selector valve 17, and thus the clutches 11, 11' of the mechanical gearbox 5 change engagement positions and the counterpressure for the setting means 21 is drained off. The displacement of the hydraulic motor 4 is thus decreased to meet the rotational speed increase requirement of the shaft 7, 7' at the gear changing instant from high to low gear. Finally the displacement of the hydraulic motor 4 is once again increased to the maximum value and the displacement of the hydraulic pump 3 is decreased to zero, whereby the vehicle once again becomes stationary.

In the embodiment described above the setting means are suitably of the servo valve type.

At several places in FIG. 1 there are illustrated tanks 13 included in the transmission for enabling bypasssing or draining servo pressure at different points in the speed change sequence as described above.

In FIG. 2 there is illustrated an alternative form of control for the speed maintenance valve 16'. In this embodiment control takes place elctrohydraulically by the use of a regulating potentiometer 22, which is suitably operated by a foot pedal controlling an electrically operated valve.

To enable vehicle travel in both directions, the flow from the hydraulic pump to the hydraulic motor can be conventionally caused to change direction. This can be done, for example, by the pump itself being formed to supply its flow in an optional direction, or by a valve being placed between the hydraulic pump and hydraulic motor for changing the direction of pressure media, whereby the whole transmission can be driven both forwards and backwards in an equivalent manner.

The sequence-controlled synchronized gear-change transmission described above thus works entirely infinitely variably over its entire speed range. Its essential function consists in, as described above, steering the displacement of the hydraulic motor 4 at the same instant and in the same proportion as the mechanical gear 5 is changed. By the known power-shift function and since displacement of the hydraulic motor 4 can be changed during full torque transfer, there is obtained continuity in the entire power transmission.

Only one embodiment has been described above. It is obviously possible to provide the mechanical gearbox with more than two gear ratios, and for the sake of simplicity, suitably the same step between each gear ratio, thus enabling simple repetition of the hydraulic motor setting for each change in gear ratio of the mechanical gearbox.

If the displacement of the hydraulic motor is given fixed adjustments with the maximum and minimum values in proportion to the mechanical gear ratio steps, the control pressure can be given comfortable overlapping values for ensuring stable change points. It is obvious, however, that it is theoretically possible to control the whole hydrostatic gear in balance with the mechanical gear ratio steps.

By the introduction of a sensor (not shown in the Figures) for the transmission pressure between hydraulic pump and motor, this sensor being caused to conventionally counteract the build-up of control pressure, it is possible to limit the take-off power so that overloading of the diesel engine is avoided. Furthermore, if the rotational speed of the diesel engine is controlled, as mentioned above, to increase further at the maximum transmission speed, the speed range of the vehicle can also be increased.

The transmission also functions for optional rotational speed of the diesel engine, which gives the possibility of separately regulating the engine to work at its most economical revolutions for each transmission stage.

I claim:

1. A synchronized mechanical-hydrostatic gearbox with infinitely variable drive ratio, including a hydrostatic gear with a hydraulic transmission motor of variable displacement, a mechanical gearbox mechanically connected to said hydraulic transmission motor and having at least two gear ratios, means for supplying a control pressure to said transmission motor, a first setting means for said transmission motor connected to said means for supplying a control pressure to change the displacement of said transmission motor in response to the control pressure, a gear selection valve also connected to said means for supplying a control pressure to be operated by said control pressure in such a way that the gear ratio of the mechanical gear is changed by a predetermined step, downwards to a gear for higher speed, when the displacement of the hydraulic transmission motor reaches its minimum value, and upwards to a gear for lower speed when the displacement of said motor reaches its maximum value, and a second setting means for said transmission motor connected to said means for supplying a control pressure for counteracting, on alteration of the mechanical gear ratio, the alteration of said motor's displacement by the first setting means, and for changing the latter displacement such that the rotational speed of the output shaft from the hydrostatic gear is changed in correspondence with the change in the gear ratio of the mechanical gearbox.

2. A gearbox as claimed in claim 1, wherein the maximum and minimum displacements of said motor are adjusted in proportion to the gear ratio alteration between the gears of the mechanical gearbox.

3. A gearbox as claimed in claim 1, wherein the hydrostatic gear includes a hydraulic transmission pump also with variable displacement and connected to said motor and a speed maintenance valve connected controllably to regulate the transfer of control pressure to the setting means of the hydraulic transmission pump said motor and the mechanical gearbox.

4. A gearbox as claimed in claim 3, wherein the speed maintenance valve is connected to be controlled by a mechanical foot pedal, or electrohydraulically with the aid of a regulating potentiometer.

5. A gearbox as claimed in claim 3, wherein the setting means of the hydraulic transmission pump connected first to react for successively increasing control pressure such as to increase the pump displacement, and in that the setting means of said motor is adapted to reduce the displacement of the motor when the displacement of the hydraulic transmission pump has reached a predetermined maximum value.

6. A gearbox as claimed in claim 3, wherein the hydraulic transmission pump is adapted to supply flow to said motor optionally in the direction of the pressure or return lines for vehicle travel forward or in reverse.

7. A gearbox as claimed in claim 1, wherein the gear selection valve is adapted to switch the mechanical gearbox to a large gear ratio (low speed gear) for control pressures below a predetermined threshold value and for control pressures exceeding the threshold value to switch to a small gear ratio (high speed gear).

8. A gearbox as claimed in claim 1, wherein a hydraulic pump for servo pressure is connected to provide said control pressure.

9. A gearbox as claimed in claim 1, wherein the mechanical gearbox has more than two gear ratio steps, each step having an equal gear ratio and in that said hydraulic transmission motor is disposed to alter its displacement corresponding to the alteration in gear ratio of mechanical gear at each change of gear ratio.

* * * * *